(12) United States Patent
French

(10) Patent No.: US 11,472,719 B2
(45) Date of Patent: Oct. 18, 2022

(54) COATED GRANULAR WATER FILTRATION MEDIA

(71) Applicant: Derek French, Painesville, OH (US)

(72) Inventor: Derek French, Painesville, OH (US)

( * ) Notice: Subject to any disclaimer, the term of this patent is extended or adjusted under 35 U.S.C. 154(b) by 200 days.

(21) Appl. No.: 16/937,751

(22) Filed: Jul. 24, 2020

(65) Prior Publication Data
US 2021/0039965 A1 Feb. 11, 2021

Related U.S. Application Data

(60) Provisional application No. 62/974,363, filed on Nov. 26, 2019, provisional application No. 62/922,404, filed on Aug. 7, 2019.

(51) Int. Cl.
| | | |
|---|---|---|
| *C02F 1/28* | (2006.01) | |
| *C02F 1/50* | (2006.01) | |
| *C02F 1/70* | (2006.01) | |
| *B01J 20/28* | (2006.01) | |
| *B01J 20/30* | (2006.01) | |
| *B01J 20/32* | (2006.01) | |

(52) U.S. Cl.
CPC ........... *C02F 1/288* (2013.01); *B01J 20/2803* (2013.01); *B01J 20/28004* (2013.01); *B01J 20/3042* (2013.01); *B01J 20/324* (2013.01); *B01J 20/3223* (2013.01); *B01J 20/3236* (2013.01); *C02F 1/50* (2013.01); *C02F 1/705* (2013.01); *C02F 2303/16* (2013.01)

(58) Field of Classification Search
None
See application file for complete search history.

(56) References Cited

U.S. PATENT DOCUMENTS

| | | | |
|---|---|---|---|
| 2,145,901 A | 2/1939 | Shoemaker | |
| 3,200,104 A * | 8/1965 | Kiyokazu | C08F 8/12 526/89 |
| 3,222,277 A | 12/1965 | Joyce | |
| 3,721,072 A * | 3/1973 | Clapham | B01D 46/521 55/514 |
| 4,430,226 A | 2/1984 | Hegde et al. | |
| 4,551,254 A | 11/1985 | Imada et al. | |
| 4,869,960 A | 9/1989 | Gibb et al. | |
| 5,196,118 A | 3/1993 | Heskett | |
| 5,198,118 A * | 3/1993 | Heskett | C02F 1/705 210/764 |
| 5,275,737 A | 1/1994 | Heskett | |
| 5,314,623 A | 5/1994 | Heskett | |
| 5,451,444 A | 9/1995 | Deliso et al. | |
| 5,487,917 A | 1/1996 | Gadkaree | |
| 6,395,522 B1 | 5/2002 | Defilippi et al. | |
| 7,156,994 B1 | 1/2007 | Archer | |
| 7,303,683 B2 | 12/2007 | Cumberland | |
| 9,427,728 B2 | 8/2016 | Sidheswaran et al. | |
| 11,234,410 B2 * | 2/2022 | Li | B01J 20/3028 |
| 2002/0195407 A1 | 12/2002 | Levy | |
| 2005/0079356 A1 | 4/2005 | Rathenow et al. | |
| 2005/0228478 A1 * | 10/2005 | Heidner | A61F 2/91 623/1.11 |
| 2006/0183812 A1 | 8/2006 | Miller et al. | |
| 2007/0197980 A1 * | 8/2007 | Barry | A61L 29/103 623/1.42 |
| 2010/0206799 A1 * | 8/2010 | Leavitt | C02F 1/002 210/314 |
| 2011/0293756 A1 * | 12/2011 | Suzuki | C12P 19/14 424/750 |
| 2012/0305467 A1 * | 12/2012 | Giebelhausen | B01J 20/3295 502/402 |
| 2018/0203356 A1 * | 7/2018 | Mühlfeit | G03F 7/40 |
| 2019/0150396 A1 * | 5/2019 | Li | B01J 20/3293 |
| 2019/0262797 A1 * | 8/2019 | Larson | B09B 1/002 |
| 2020/0262936 A1 * | 8/2020 | Barin | B01J 20/3219 |
| 2020/0377420 A1 * | 12/2020 | Watkins | H01M 4/049 |

FOREIGN PATENT DOCUMENTS

| | | |
|---|---|---|
| EP | 0238639 B1 | 12/1992 |
| JP | 2002-35578 A1 * | 2/2002 |

OTHER PUBLICATIONS

Loctite CR 3507 product brochiure, https://www.henkel-adhesives.com/cn/en/product/potting-compounds/loctite_cr_3507.html (downloaded Jun. 13, 2022) (Year: 2022).*
Ma, et al., Synthesis and Characterization of Cryogenic Adhesives Based on Epoxy-Modified Polyurethane Resin Systems, Polymer International 35 (1994) 361-370 (Year: 1994).*

\* cited by examiner

*Primary Examiner* — Chester T Barry
(74) *Attorney, Agent, or Firm* — Rankin, Hill & Clark LLP

(57) ABSTRACT

A plurality of particles, for use in filtering drinking water to reduce contaminants, where the particles are inorganic particles having a size that ranges from about 0.15 mm to 6350 mm, having a coating which can be powdered activated carbon, powdered zinc and copper alloy, powdered manganese dioxide, or mixtures of the powders, where the powders are bound to the surface of the inorganic particles by a cured organic adhesive which will not elute any volatile organic chemicals (VOC), metals or organic contaminants into water when it is cured.

17 Claims, No Drawings

COATED GRANULAR WATER FILTRATION MEDIA

CROSS REFERENCE TO RELATED APPLICATIONS

The present application claims the benefit of earlier filed provisional patent Application No. 62/922,404, filed Aug. 7, 2019, and Application No. 62/974,363, filed Nov. 26, 2019, both of which are hereby incorporated by reference.

BACKGROUND OF THE INVENTION

The present invention is directed to granular water filtration media in which the granules are coated with powdered copper zinc alloy, powdered manganese dioxide, powdered activated carbon or combinations the powders, and bound to the surface by a cured organic adhesive.

There are many types of catalytic or reductive granular filter material commonly used in water filtration for municipal or industrial drinking or wastewater treatment. These materials are typically made from or coated with a single reducing or catalytic surface. The existing methods of chemical or reactive chemistry attachment to substrate is most often to drying or heating liquid chemicals in attempt to fuse them to these surfaces.

Granular sand (silica) is the most common filter material in use and is the most common substrate for the coating of chemistries. The smooth nature of the silica sand substrate makes attachment difficult and requires catalytic, heat-based attachment methods.

The issue with using granular activated carbon (GAC) for dechloramination is that when chlorinated water reacts with the GAC the chloramines disassociate resulting in free ammonia in the GAC bed. The presence of dissolved oxygen in the water, free ammonia and carbon from the media results in accelerated biological growth of nitrifying bacteria. This nitrification process caused biological growth in the media and this biological growth starts to cover the GAC and reduce the effective area of GAC available for further dichlorination. This means that only a portion of the bed is now available for the reductive disassociation of chloramines due to biological overgrowth and subsequent fouling of the GAC surface separating it from the surrounding fluid.

To curb the growth of biology in GAC various granular media manufacturers have combined granular alloy (Cu/Zn) with granular activated carbon (GAC) in the same filter device with separate distinct grains being mixed in varying ratios. This has been marginally effective as, once backwashed, the zinc alloy which is heavier sinks to the bottom the filter bed and carbon rises to the top of the filter. This stratification results in active bacterial content in the carbon section of the filter bed. By blending alloy and carbon and attaching it to each discrete substrate grain the segregation and stratification is mitigated, thus providing improved bacteriostatic performance of the filter over all.

Examples of teachings of carbon coated substrates include U.S. Pat. No. 6,395,522 to DeFilippi et al., which teaches a biologically active support containing bound adsorbent particles, such as activated carbon, bound by a polymeric binder to a polymeric foam substrate. The bound carbon is used as a method to adsorb pollutants during periods of high concentration in the fluid stream and then the carbon de-adsorbs the pollutants back into the waste stream during periods of low concentration. U.S. Pat. No. 5,487,917 to Gadkaree teaches a method of producing activated carbon to a substrate by impregnating a substrate with a crosslinking resin and a curing catalyst, followed by curing the resin, carbonizing the resin, and activating the carbon as part of the heating process. US Patent Publication No. 2006/0183812 to Miller at al. teaches the attachment of carbon to a substrate for gas phase adsorption using a wax based adhesive.

Other examples of teachings of carbon coated substrates include U.S. Pat. No. 5,451,444 to DeLiso et al., and US Pat. Publ. 2005/0079356 to Rathenow et al. DeLiso teaches an inorganic substrate have a carbon coating made by curing and heating a carbon precursor liquid to convert the coating to carbon. Rathenow also teaches cured carbon coatings on substrates which can be films and fibers.

The use of copper and zinc alloys and manganese dioxide ($MnO_2$) in water treatment is known generally. For example, U.S. Pat. No. 7,303,683 to Cumberland teaches a combination of activated carbon and particles of insoluble inorganic material, for use in a microorganism-removing filter medium. U.S. Pat. No. 4,551,254 to Imada et al. teaches the use of microporous manganese dioxide for use as a water purifier. U.S. Pat. No. 3,222,277 to Joyce teaches the use of manganese dioxide impregnated carbon for use in the removal of iron from water.

U.S. Pat. No. 2,145,901 to Shoemaker teaches the use of a mixture of rock, cement, and finely divided manganese dioxide and black oxide of iron as an agent for the removal of iron manganese or hydrogen sulfide from water.

U.S. Pat. No. 5,198,118 to Heskett teaches the use of a bed of copper/zinc alloy and activated carbon for treatment of water, while U.S. Pat. No. 7,156,994 to Archer teaches the use of zinc/copper alloy and activated carbon, along with ion exchange resin in a drinking water filter. European Patent publication EP0238639 to Heskett teaches the use of copper/zinc alloy as a bed of metal particles for reducing bacterial activity of water.

U.S. Pat. No. 4,869,960 to Gibb et al. teaches the coating of ceramic granular substrate with epoxy resin, but it is for use as an oil and gas proppant.

SUMMARY OF THE INVENTION

The present invention is directed to plurality of particles, for use in filtering drinking water to reduce contaminants, where the particles are inorganic particles having a size that ranges from about 0.15 mm to 6350 mm, having a coating which can be powdered activated carbon, powdered zinc and copper alloy, powdered manganese dioxide, or mixtures of the powders, where the powders are bound to the surface of the inorganic particles by a cured organic adhesive which will not elute any volatile organic chemicals (VOC), metals or organic contaminants into water when it is cured.

DETAILED DESCRIPTION OF THE INVENTION

The present invention is directed to granular water filtration media in which the granules are coated with copper zinc alloy or manganese dioxide or combinations thereof with or without powdered activated carbon.

The present invention is directed to an inert ceramic or expanded clay substrate coated with a functional active coating that may include a combination of two or more dissimilar materials including copper zinc alloy, manganese dioxide, and granular or powdered activated carbon (PAC) powders. The process of manufacture allows for secure attachment of multiple powders in varying ratios to the surface of a ceramic substrate to create active surfaces with improved performance and lifespan of the active filter materials.

The manufacturing process requires using an insoluble cementitious coating or suitable organic binder to attach insoluble powdered materials to the surface of a substrate in such a way that the powder stays firmly affixed when continuously submerged and can withstand the mechanical forces applied during backwashing and air scour cycles.

The functional multi-material coated ceramic media of the present invention would have a number of advantages over conventional media:

a) The use of powdered alloy combined with powdered carbon on the surface of the media will result in effective dechlorination as well as simultaneously providing bacteriostatic conditions to reduce the potential for biological growth on the surface of the media. This reduction in biological overgrowth will improve media performance by limiting biological growth over surface active area leaving the catalytic carbon powdered surface available to the influent water over a longer period than materials with singular carbon or carbon only coated materials.

b) High uniformity in size would offer better hydraulics capacity (lower head loss) than conventional aggregate materials by eliminating fines and dust associated with aggregates.

c) Surface roughness of ceramic media as compared to smooth crystalline structures like sand or glass offers a greater particle attachment potential due to higher surface area and irregular shape.

d) A robust expanded clay or ceramic substrate offers a much more robust granule which is less prone to attrition and fracturing as compared to the softer granules.

e) By coating a variety of sizes and densities, a multi-media filter (a filter with various effective size materials) with a carbon coating would provide better particle reduction as a filter.

f) The media of the present invention could be used in fixed bed filtration as well as fluid bed filtration.

The inert substrate is a granular or powered material and is in a very fine powdered form with 90% of the material having a size that generally ranges from 100 mesh down to less than 325 mesh. Granular ceramics can be employed as it has a higher surface area than sand by volume and this textured surface allows for an effective and novel attachment method using polyurethane liquid chemistry as a bonding agent while providing a secure and long-lasting bond suitable for submerged operations in all types of liquid environments including for use in potable drinking water.

The inert substrate can be silica sand, fired ceramic or expanded clay ceramics. Other ceramics such as bentonite, kaolinite, kieselguhr, diatomaceous earth, alumina, silica, zirconia, barium titanate, synthetic carbides, synthetic nitrides and synthetic borides and the like, can be used as well. The substrate has a particle size that ranges from 0.15 mm to 6350 mm with the preferred size being 0.5 mm in effective size (d10) as determined by sieve analysis. The preferred substrate is an expanded clay or ceramic material having a surface area >20,000 $m^2/m^3$ in the 1 to 150 microns as determined by mercury perimetry with an overall pore structure generally in the 1 to 350 microns range. The substrate particles will have a Mohs surface hardness >3.0 up with a maximum Mohs hardness of 7.0, and a loose bulk density range of 0.54 $g/cm^3$ to 1.70 $g/cm^3$ with the preferred density being 0.7 $g/cm^3$. The powdered material will have a minimum 90% of the material being <0.075 mm in average size and <60% of the at 0.045 mm in size. The powdered activated carbon ("PAC") generally comes in very fine powdered form with 90% of the material generally ranges from 100 mesh down to 325 mesh in size. The powered activated carbon particles have a minimum of 90% of the particles being <0.075 mm in average size and an iodine absorption number of about 1000. Powdered activated carbon has excellent adsorptive capacity and can provide an excellent place to absorb organic contaminants. The activated carbon material will have an iodine adsorption number of between 500 & 1300 with the preferred iodine adsorption number being 1000. Carbon decomposes oxidants (removes chlorine, peroxide, ozone etc.) and it is light weight, inexpensive but is highly prone to biological growth.

Copper and zinc alloy particles are a very fine powder with 90% of the material generally ranging from 100 mesh down to 325 mesh. The preferred ratio of Cu to Zn is 50/50 by volume although the ratio may may be as high as 76% copper, with the balance being zinc. The alloy powder will, preferably, have a low lead amount of <0.01% and , preferably, a distribution of from <1% larger than 200 mesh down to the 325 mesh. The benefits of copper alloys are well known, including reduced bacterial contamination and continuous and ongoing antibacterial action. The copper/zinc alloy particles have a size of 65%-85%<325 mesh, with <5% being more than 200 mesh, a density of 3.03 $g/cm^3$, and a lead content <0.004%. The ratios of copper to zinc vary from 50/50 to 70%-73% copper, 27-30% zinc.

The use of copper/zinc alloy along with powdered carbon produces an effective material for reducing chlorine and/or chloramines from water. But, the copper component of the alloy acts as a bacteriostatic agent to prevent microorganism growth on or around the granular material. The alloy decomposes oxidants (removes chlorine, peroxide, ozone etc.) much the way carbon does but the metal alloy is harder, does not grow biology and is expensive and much heavier. The use of solid metal alloy granules or larger particles is effective, however the reaction is on the surface, therefore the core of the particle is not beneficial and the entire mass of the particle being alloy makes it very heavy. By applying the alloy powder to the surface of a substrate, the final product is reactive but the entire coated particle is ½-⅓ the weight of an alloy particle making it easier to fluidize in a backwash (clean the filter) and it reduces material freight costs.

Applying metal alloy powder with carbon allows for fine mesh particles with a carbon coating that reduces oxidants and provides a bacteriostatic "halo" effect that mitigates bacterial growth on the particle (carbon) surface while also providing oxidant reduction capacity. This also reduces the cost of the material versus a solid alloy product.

The manganese dioxide is a very fine powder with 90% of the material generally ranging from 100 mesh down to 325 mesh in size. The powder particles preferably comprise 90 to 100% $MnO_2$. The manganese dioxide oxidizes insoluble metals (iron and manganese) from raw water.

The use of the alloy and manganese dioxide and/or carbon reduces oxidizers and inhibits biological growth on the particle making the surface of the media available for further reactivity (stops biological overgrowth). When the powdered coating is a combination of alloy, manganese dioxide and carbon, and the ratio of alloy to manganese dioxide to carbon is between about 60%-80% manganese dioxide, 10%-30% alloy, and 5%-15% carbon by volume.

The binder should remain intact when submerged in water and hold the powders fast. Cementitious coatings include, but not limited to; Portland cement, high alumina refractory cements and zeolite cements (those primarily comprised of $Al_2O_3$ & $SiO_2$). The preferred binders include epoxies and silicone sealant adhesives.

When the adhesive to be used is a liquid, flowable epoxy-based bonding agent it will preferably be a two-part, non-volatile liquid epoxy that has a viscosity of between 10,000 and 30,000 centipoise, and will have a mixed cure time of 24 hours when cured in an ambient temperature of 32° C. and that cure time will extend to 74 hours when cured at 17° C. and the cured epoxy will be suitable for continuous immersed conditions within 7 days of application. Further, the epoxy will not elute any VOC, metals, or organic contaminants into water once cured, will withstand use in water up to 82° C., and will be applied in a range of 10 ml/L to 30 ml/L of dry substrate, with the preferred application amount being 15 ml per L of dry substrate.

The preferred adhesive binder to be used is a liquid, flowable polyurethane, silicon or cementitious mineral based bonding agent with the preferred is a two-part, non-volatile liquid curable chemistry that has a viscosity of between 8,000 and 30,000 centipoises. The polyurethane will have a mixed cure time of 24 hours when cured in an ambient temperature of 32° C. and that cure time will extend to 74 hours when cured at 17° C. and the cured polyurethane will be suitable for continuous immersed conditions within 7 days of application. The polyurethane will not elute any VOC, metals or organic contaminants into water once cured and will withstand use in water up to 82° C. The polyurethane is applied in a range of 10 ml/L to 30 ml/L of dry substrate, with the preferred application amount being 15 ml per L of dry substrate.

The process involves attaching powdered materials to a high surface area inert granular substrate by cementing or attaching multiple types (2 or more) of powdered materials onto the exterior of a single substrate in a way that it can withstand being submerged indefinitely in raw influent water. The binder coating needs to be a thin layer with a strong bond to hold the powder on its surface. The coating when applied and cured acts as a bonding agent between substrate and powder.

The preferred coating methodology uses a two-part, high solids, low VOC polyurethane such as H. B. Fuller UR3507 which uses a two-part polyurethane that is blended at a ratio of 2:1 Part A to Part B. The two-part polyurethane is thoroughly blended then spray applied to a volume of granular substrate that is being agitated in a variable speed ribbon blender. The movement of the ribbon blender ensures homogenous coating of the granules. The polyurethane, when applied will have a viscosity of approximately 800 centipoise and will evenly coat the substrate. The polyurethane will be cured for permanent submerged operations in 3-5 days at 25° C. curing temperature.

Multiple types of fine powdered material can be permanently attached to the surface of an inert substrate such as silica sand, ceramic or expanded clay substrate by applying water insoluble polyurethane coating to the substrate surface and subsequently attaching powdered activated carbon combined with metal alloy to the exterior surface where it will remain exposed to the aqueous fluid surrounding the assembled particle. All materials combined to make the particles of the present invention have been selected so that when combined they will pass ANSI/NSF-61 Test Protocol allowing for the particles to be used for treatment of drinking water.

The mixing can be done in a low shear continuous or batch mixing device such as a ribbon blender, pug mill or rotating cement mixing drum.

The polyurethane component is mixed in by heating it to the optimal temperature of 26.6° C. and is slowly poured into the activated mixer with the polyurethane being well distributed to coat all substrate granules. The polyurethane coating is applied to the external surface of the substrate in a range from 25 microns to 75 microns in thickness with the preferred thickness is 50 microns.

The powdered materials are each applied at a rate between 15 and 95 grams per liter of substrate at varying ratios with the ideal application being specific to the rate of reactivity required for the application. The activated carbon material is applied at a rate between 20 and 35 grams per liter of substrate with the preferred application being 25 grams PAC per liter of granular substrate material.

The attachment of the powdered additive must be applied immediately after particles appear to have a relatively homogenous coating of wet polyurethane.

The powdered additive must be applied in a fashion that will both coat a majority of the inert substrate and simultaneously form a parting agent preventing granules from sticking together.

The attachment of activated carbon requires that attachment remains at the surface and not submerged into the adhesive polyurethane allowing the carbon to remain open and accessible at the surface of the inert substrate.

The coated material will be utilized in a static bed or column of filtration material submerged in water where water will be pumped either upwards or downward through the static body of coated substrate. The coated material will be employed in a bed that will vary from 300 mm to 1829 mm in height with no limits to the width and depth of the body of material with the preferred "bed" depth (column height) being 610 mm.

MANUFACTURE EXAMPLE

A granular ceramic substrate, namely fired ceramic having a size of about 0.22 mm, as determined by sieve analysis, a Mohs hardness of >6.0, and a loose bulk density of about 1.22 g/cm³ is poured dry into a low shear batch ribbon blender which is activated to mix the dry substrate.

H. B. Fuller UR3507 adhesive material, which uses a two-part polyurethane that is blended at a ratio of 2:1 Part A to Part B, was mixed and heated to its optimal temperature of 26.6° C. and a viscosity of between about 10,000 and 30,000 centipoises, was slowly poured into the activated mixer with the polyurethane being well distributed to coat all substrate granules. The polyurethane coating is applied to the external surface of the substrate in a range from 25 microns to 75 microns in thickness with the preferred thickness being 50 microns. The exact thickness and amount are not critical, but there should be enough polyurethane to coat the substrate particles and adhere to powdered particles. If too much adhesive is used, it would be a waste of materials and result in the substrate particles being adhered to one another.

The metal alloy and/or the manganese dioxide powdered materials are added to the mixer within 5 minutes before epoxy begins to gel. The powders are added at a rate between 15 and 95 grams per liter of substrate at varying ratios with the ideal application being specific to the rate of reactivity required for the application. The metal alloy in all configurations is added first and, if being used with manganese dioxide, the manganese dioxide is added next. When there is a mixture of metal alloy or manganese dioxide particle and activated carbon, the activated carbon material is always added last at a rate between 20 and 35 grams per liter of substrate material. Although not necessary, some additional carbon can be employed, which will act as a parting agent to stop agglomeration of the particles and reduce sticking of the particles. When metal alloy and manganese dioxide and activated carbon are to be place on the substrate particles, the addition order will be metal alloy particles, then manganese dioxide particles and finally activated carbon. A small amount of excess powdered carbon is acceptable in the final product as it prevents curing material from sticking and/or agglomerating together and the excess carbon will rinse out of the material.

The attachment of the powdered additive is achieved by applying the powered additive immediately after the substrate particles appear to have a relatively homogenous coating of wet polyurethane. The amount of powered additive that is adhered is determined by the amount of powered additive that is in the residual after mixing.

The adherence of the powdered additive is also observed by looking at the particles having power adhering to the substrate. For example, under a 1000× microscope, the particles of copper/zinc alloy and/or manganese dioxide plus activated carbon were observed adhered to the substrate particles. The particles were also subjected to tumbling in a tumbling apparatus that was half-full of water, and the particles retained their powdered additive coating. The coating appeared as continuous, spaced coating of powdered particles, with alloy particles and/or manganese dioxide particles and activated carbon adhered to the outer substrate of the particles. Coated substrate particles having powdered additive of various combinations of copper/zinc alloy, manganese dioxide, and active carbon were achieved.

Coated substrate particles with carbon only can produce a carbon coated product that is half the size of the smallest granular activated carbon particles available, while being harder. Granular activated carbon ("GAC") has a Mohs hardness of 2.0-3.0 while the coated ceramic substrate has a Mohs hardness of >6.0 which makes it over twice as hard as compared to GAC. When used, the carbon coated particles are a better particles filter. The smallest commercially available granular GAC available is 0.5 mm effective size while the coated particles are <0.25 mm thus improving particle filtration.

Substrates coated with only $MnO_2$ powder achieved an application of 99 grams of $MnO_2$ powder per Liter of substrates. When the ceramic substrates were coated with carbon powder only, a coating of 25.6 grams of powdered activated carbon per liter of substrate was achieved.

By having both copper/zinc and/or $MnO_2$ particles and carbon particles on the surface, the carbon coated material will provide a harder crush strength (higher crush strength than granular carbon) giving it a longer life in harsh mechanical environments. Further, carbon particles by themselves are not generally good filters. The ceramic substrate is a filter media that removes 99% of 10-micron particles as a filter media.

Use Example

Coated particles were tested for surface activity and availability of various coatings to the surrounding fluid (water). This test involves flowing water containing chlorine and chloramines with removals as stipulated under the NSF/ANSI-42 system test requiring >50% and >83% respectively. The test looks at "Empty Bed Contact Times" (or EBTC) which is the standard model for testing carbon's ability to dechlorinate water. The minimum test time was a 3.0 Min EBCT. The use of the coated particles in accordance with the present invention was determined to provide an average 94% removal of chlorine and 84% removal of chloramines across the media and measuring changes in the water quality at a variety of doses and flow rates. The test involved a variety of chlorine/water strengths. The test also varied the flow rate through the material. The testing was on coated particles providing 8 oz. of powdered carbon (PAC) and 4.5 lbs. of alloy per cubic foot of coated particles. The coated particles were made as noted above.

The material is placed into a 4"diameter clear PVC column and untreated well water is pumped through the column in a down flow direction. Chlorine and chloramines are dosed into the raw water before it enters the column at varying dosages and the amount in the water is verified with a handheld device (Hach DR890) to confirm both the feed chlorine/chloramine amount and the effluent amount leaving the column.

The available activated carbon powder on the surface reduces total chlorine demonstrating the carbon is on the surface and open to the surrounding fluid. The alloy particles provided antimicrobial activity.

To demonstrate the surface activity and reductive capacity of the coated bed of material of the present invention, water was processed through a bed of a 10" deep bed of alloy/carbon coated media. The values below are % removal of both chlorine and chloramines from water run through the bed. The water is in contact with the media for a 3-minute Empty Bed Contact Time (EBCT) which is considered a minimal contact time for dechlorination and dechloramination by carbon producers. The percent removal values are as good as or better than the performance numbers for typical granular activated carbon materials.

| Feed Water Total Chlorine | Treated Water Total Chlorine | Percent Chlorine Reduction | Feed Water Mono Chloramine | Treated Water Mono Chloramine | Percent Chloramine Removal |
|---|---|---|---|---|---|
| 2.5 | 0.03 | 98.80% | 3.16 | 0.08 | 97.47% |
| 11 | 0.04 | 99.64% | 3.15 | 0.01 | 99.68% |
| 2.6 | 0.2 | 92.31% | 1.45 | 0.05 | 96.55% |
| 1.5 | 0.03 | 98.00% | 1.45 | 0.05 | 96.55% |
| 2.4 | 0.03 | 98.75% | 3.98 | 0.1 | 97.49% |
| 2.82 | 0.13 | 95.39% | 3.08 | 0.12 | 96.10% |
| 2.96 | 0 | 100.00% | 3.14 | 0.12 | 96.18% |
| 3.3 | 0 | 100.00% | 2.21 | 0.06 | 97.29% |
| 2.66 | 0.03 | 98.87% | 0.53 | 0 | 100.00% |
| 2.6 | 0.27 | 89.62% | 2.16 | 0.27 | 87.50% |
| | Avg Chlorine Removal | 97.14% | | Avg Chloramine Removal | 96.48% |

Addition of bacterial culture to static samples of media are then incubated and total plate counts are measured. HPC or heterotrophic plate count is the measurement for the number of live culturable heterotrophic bacteria in water and is measured as colony forming units (cfu). The ratio of alloy metal to carbon can be manipulated to impact the bacteriostatic nature of the material in a fluid that has existing bacterial content. The results of mixed alloy coating versus pure carbon versus uncoated ceramic substrate are shown below. The influent concentrations for each are individually compared to the effluents.

| SAMPLE | Initial Biological HPC Content (cfu/ml) | HPC Content after 3 Day Incubation (cfu/ml) | Outcome |
|---|---|---|---|
| Copper Zinc Alloy + Powdered Activated Carbon on Ceramic Particles (Alloy/Carbon Ratio - 2.5/1) | 27,000 | 9,900 | Reduction |
| Ceramic Particles | 45,000 | 500,000 | Growth |
| Granular Activated Carbon Particles | 45,000 | 150,000 | Growth |

While the amount and kind of powder on an inorganic particle can be varied depending upon the needs, the use of the particles of the present invention can provide substantial improvement in water quality. For example, an inorganic particle having 107 g alloy per liter of substrate and 15 g of carbon per liter of substrate provides >90% dichlorination of water while simultaneously ensuring a bacteriostatic environment. An inorganic particle having 24 g alloy per liter of substrate, 12 grams of carbon per liter of substrate and 86 g manganese dioxide powder per liter of substrate provides >90% dechlorination of water while simultaneously ensuring a bacteriostatic environment and a reactive surface for the oxidation of dissolved manganese and iron in the water. An inorganic particle having 40 g of carbon per liter of substrate provides >90% dechlorination of water while simultaneously providing an effective and sustainable filtration mechanism in water. An inorganic particle having 210 g alloy per liter of substrate provides >90% dechlorination of water while simultaneously ensuring a bacteriostatic environment.

Although the invention has been described in detail with reference to particular examples and embodiments, the examples and embodiments contained herein are merely illustrative and are not an exhaustive list. Variations and modifications of the present invention will readily occur to those skilled in the art. The present invention includes all such modifications and equivalents. The claims alone are intended to set forth the limits of the present invention.

I claim:

1. A plurality of particles for use in water filtration comprising inorganic particles having a size that ranges from about 0.15 mm to 6350 mm, having a coating comprising powdered zinc and copper alloy bound to a surface of the inorganic particles by a cured organic adhesive that will not elute any volatile organic chemicals (VOC), metals or organic contaminants into water, wherein the powdered zinc and copper alloy provides a bacteriostatic surface.

2. The plurality of particles of claim 1, wherein the cured organic adhesive is a polyurethane or epoxy adhesive.

3. The plurality of particles of claim 1, wherein the cured organic adhesive is a polyurethane having a gel time of 9-13 minutes at 32° C. and an 80% cure in 14 hours with a 100% cure before 7 days when cured in an ambient temperature of 32° C.

4. The plurality of particles of claim 1, wherein the cured organic adhesive is a liquid, flowable epoxy, polyurethane, silicone or cementitious mineral-based bonding agent that has a viscosity of between 8,000 and 30,000 centipoises.

5. The plurality of particles of claim 1, wherein the coating further comprises powdered activated carbon, wherein 90% of the powdered activated carbon has a size ranging from 100 mesh down to 325 mesh in size and an iodine adsorption number of between 500 and 1300.

6. The plurality of particles of claim 1, wherein the powdered zinc and copper alloy has a ratio of Cu to Zn of 50/50 by volume or higher, has a lead amount of <0.01%, and a size distribution of from <1% larger than 200 mesh down to 325 mesh.

7. The plurality of particles of claim 1, wherein the coating further comprises powdered manganese dioxide, wherein 90% of the powdered manganese dioxide has a size ranging from about 100 mesh down to 325 mesh and comprise about 90% to 100% $MnO_2$.

8. The plurality of particles of claim 1, wherein the inorganic particles are selected from the group consisting of silica sand, fired ceramic and expanded clay ceramics.

9. The plurality of particles of claim 1, wherein the coating further comprises powdered activated carbon, and wherein the ratio of the powdered zinc and copper alloy to the powdered activated carbon is about 10%:90% by volume.

10. The plurality of particles of claim 1, wherein the coating further comprises manganese dioxide and powdered activated carbon, and the ratio of the alloy to manganese dioxide to the powdered activated carbon is between about 60%-80% the manganese dioxide, 10%-30% the powdered zinc and copper alloy, and 5%-15% the powdered activated carbon by volume.

11. The plurality of particles of claim 1, wherein the powdered zinc and copper alloy provides a reductive surface for reducing oxidant chemicals.

12. The plurality of particles of claim 1, wherein the inorganic particles are selected from silica sand, fired ceramic, expanded clay ceramics, bentonite, kaolinite, kieselguhr, diatomaceous earth, alumina, silica, zirconia, barium titanate, synthetic carbides, synthetic nitrides and synthetic borides.

13. The plurality of particles of claim 1, wherein the inorganic particles have a Mohs surface hardness of about >3.0 up to a Mohs hardness of 7.0 and a loose bulk density within the of range of 0.54 $g/cm^3$ to 1.70 $g/cm^3$.

14. The use of the plurality of particles of claim 1 comprising filtering contaminated water using the plurality of particles to reduce contaminants in the water and to produce filtered drinking water.

15. The plurality of particles of claim 1, the inorganic particles having a size of about 0.5 mm.

16. A plurality of particles for use in water filtration comprising inorganic particles having a size that ranges from about 0.15 mm to 6350 mm, having a coating comprising powdered activated carbon and powdered zinc and copper alloy bound to a surface of the inorganic particles by a cured organic adhesive that will not elute any volatile organic chemicals (VOC), metals or organic contaminants into water, wherein the powdered activated carbon and the powdered zinc and copper alloy provide a bacteriostatic surface.

17. A plurality of particles for use in water filtration comprising inorganic particles having a size that ranges from about 0.15 mm to 6350 mm, having a coating comprising powdered manganese dioxide and powdered zinc and copper alloy bound to a surface of the inorganic particles by a cured organic adhesive that will not elute any volatile organic chemicals (VOC), metals or organic contaminants into water, wherein the powdered manganese dioxide and the powdered zinc and copper alloy provide a bacteriostatic surface.

* * * * *